United States Patent
Yamamoto et al.

(10) Patent No.: US 6,271,160 B1
(45) Date of Patent: *Aug. 7, 2001

(54) OXIDE PHOSPHORESCENT GLASS CAPABLE OF EXHIBITING A LONG LASTING AFTERGLOW AND PHOTOSTIMULATED LUMINESCENCE

(75) Inventors: Yoshinori Yamamoto; Masaaki Yamazaki; Naruhito Sawanobori; Shinobu Nagahama, all of Saitama-ken (JP)

(73) Assignee: Sumita Optical Glass, Inc., Urawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,096
(22) Filed: May 12, 1999

(30) Foreign Application Priority Data

May 13, 1998 (JP) .................................... 10-130344

(51) Int. Cl.[7] .............................. C03C 3/253; C03C 4/12; C03C 3/145; C03C 3/15; C03C 3/062

(52) U.S. Cl. .............................. 501/42; 501/49; 501/50; 501/52; 501/64; 501/65; 501/66; 501/67; 501/69; 501/72; 501/73; 501/78; 501/79; 252/301.6 F; 252/301.6 R; 252/301.4 F

(58) Field of Search ................................. 501/42, 64, 65, 501/73, 78, 79; 252/301.6 F, 301.6 R, 301.4 F

(56) References Cited

U.S. PATENT DOCUMENTS

| | | |
|---|---|---|
| 3,714,059 | 1/1973 | Shaw et al. .................... 252/301.4 F |
| 4,999,321 * | 3/1991 | Kohli .................................... 501/42 |

(List continued on next page.)

FOREIGN PATENT DOCUMENTS

| | | | |
|---|---|---|---|
| 779 254 | * | 6/1997 | (EP) . |
| 0 926 102 | | 6/1999 | (EP) . |

(List continued on next page.)

OTHER PUBLICATIONS

Ageeva L et al.: "The Spectral–Luminescence Parameters of Neodymium–Activated Alkali Germanate Glasses with a High Concentration of GEO2" Soviet Journal of Glass Physics and Chemistry, vol. 16, No. 1, Jan. 1, 1990, pp. 15–20, XP00169372 ISSN: 0360–5043.

(List continued on next page.)

*Primary Examiner*—David R Sample
(74) *Attorney, Agent, or Firm*—Pillsbury Winthrop LLP

(57) ABSTRACT

The present invention provides an oxide glass capable of exhibiting a long lasting afterglow and photostimulated phosphorescence, can be used not only as a material for confirming an infrared laser or controlling an optical axis, but also as a material for recording or reproducing of γ-rays, X-rays or UV-rays images and further can be used as an optical recording material of such a type that can be read. This glass material is represented, in term of atoms for making up the glass, by the following chemical composition (mol %):

| | | |
|---|---|---|
| $GeO_2$ | 21 to 80% | |
| $ZnO$ | 0 to 50% | |
| $Ga_2O_3$ | 0 to 55% | ($ZnO + Ga_2O_3$ = 3 to 55%) |
| $Tb_2O_3$ | 0 to 10% | |
| $MnO$ | 0 to 2% | ($Tb_2O_3 + MnO$ = 0.01 to 10%) |
| $R_2O$ | 0 to 45% | (R: at least one atom selected from Li, Na, K and Cs) |
| $R'O$ | 0 to 40% | (R': at least one atom selected from Mg, Ca, Sr and Ba) |
| $R_2O + R'O$ | 0.5 to 45% | |
| $SiO_2$ | 0 to 50% | |
| $B_2O_3$ | 0 to 20% | |
| $Al_2O_3$ | 0 to 20% | |
| $Yb_2O_3$ | 0 to 7% | and |
| $Ln_2O_3$ | 0 to 5% | (Ln: at least one atom selected from Sm, Dy, Tm, Pr, Y, La, Gd, Lu and Nd). |

3 Claims, 1 Drawing Sheet

U.S. PATENT DOCUMENTS 5,786,287 * 7/1998 Bayya et al. ............................ 501/42
5,955,388 * 9/1999 Dejneka .................................. 501/3

FOREIGN PATENT DOCUMENTS

422697 * 4/1974 (SU).
98/58884 * 12/1998 (WO).

OTHER PUBLICATIONS

Database Inspec 'Online,!Institute of Electrical Engineers, Stevenage, GB, Hirayama C et al.: "Fluorescence of Fe, Co, and Ni in reduced germanate glass" Electrochemical Society, Dec. 1968, 1968, USA, vol. 115, No. 12, pp. 1275–1279, XP002115735 ISSN: 0013–4651.

Database WPI Section Ch, Week 8846 Derwent Publications Ltd., London, GB; Class L01, AN 88–328789 XP002115739 & SU 1 393 811 A (Karapetyan G O), May 7, 1988 *abstract*.

Database Inspec 'Online! Institute of Electrical Engineers, Stevenage, GB Van Die A et al.: "Germanate glasses as hosts for luminescence of MN/sup 2+/ and Cr/sup3+/" Database accession No. 3134632 XP002115736 *abstract* –& Journal of Non–Crystalline Solids, Jan. 1988, Netherlands, vol. 99, No. 1, pp. 32–44, XP002115733 ISSN: 0022–3093.

Database Inspec 'Online! Institute of Electrical Engineers, Stevenage, GB Grishchuk E V et al.: "Some features of the concentration quenching of the luminescence of Tb/sup3+/ (/sup 5/D/sub3/) in sodium germanate glass" Database accession No. 3449637 XP002115737 *abstract* –& Fizika I Khimiya Stekla, Nov.–Dec. 1987, USSR, vol. 13, No. 6, pp. 874–879, XP00215734 ISSN: 0132–6651.

* cited by examiner

OXIDE PHOSPHORESCENT GLASS CAPABLE OF EXHIBITING A LONG LASTING AFTERGLOW AND PHOTOSTIMULATED LUMINESCENCE

BACKGROUND OF THE INVENTION

1. Field of the Invention

This invention relates to an oxide glass capable of exhibiting a long lasting afterglow and photostimulated luminescence, whereby energy can be accumulated by radiation excitation, for example, by γ-rays, X-rays, UV-rays, etc., light emission can be continued for a long time even after stopping the excitation, so that the oxide glass can be used as a phosphorescent material for night illumination or night signal, and furthermore, photostimulated luminescence can be exhibited by irradiation of visible rays or infrared rays, which is useful for confirming an infrared laser or controlling an optical axis of a laser beam, so that recording or reproducing of γ-rays, X-rays or UV-rays images can be effected, and which can be used as an optical recording material capable of reading and writing.

2. Description of the Prior Art

Phosphorescent materials or photostimulated luminescence phosphor using rare earth elements have widely been used up to the present time. As a phosphorescent material, there can practically be used $SrAl_2O_4$:$Eu^{2+}$, $Dy^{3+}$, etc. and as a photostimulated luminescence phosphor, there has already been developed $BaFBr$:$Eu^{2+}$, etc. These are opaque materials only exhibiting superficial phosphorescence, generally obtained by coating a suitable carrier with a powdered phosphorescent material or photostimulated luminescence phosphor.

On the other hand, a glass capable of exhibiting a photostimulated luminescence without coating a photostimulated luminescence phosphor has been disclosed in Japanese Patent Laid-Open Publication No. 221336/1997. In addition, Japanese Patent Application Nos. 346362/1997 and 88674/1998 respectively disclose obtaining phosphorescent glasses of $SiO_2$—$B_2O_3$—$ZnO$—$Tb_2O_3$ system and $SiO_2$—$Ga_2O_3$—$Na_2O$—$Tb_2O_3$ system.

In the case of coating a powdered phosphorescent material or photostimulated luminescent phosphor, dispersion of the coating thickness or peeling-off of the coated surface occurs whereby to cause light and shade of the phosphorescence. In order to increase the emission intensity, it is required to coat a phosphorescent material or photostimulated luminescence phosphor with a larger thickness, but the coating is limited by increase of opaqueness thereof. Since a phosphorescence emitted from a grain boundary in the phosphorescent material or photostimulated luminescence phosphor is scattered, furthermore, no clear image can be obtained.

A photostimulated luminescent glass described in Japanese Patent Laid-Open Publication No. 221336/1997 utilizes $Ce^{3+}$ or $Eu^{2+}$ as an active ion for emission. In order to obtain these active ions, it is necessary to add a reducing agent or to melt in a reducing atmosphere. Furthermore, observation of the emission is difficult because of being UV light or blue light.

SUMMARY OF THE INVENTION

It is an object of the present invention to provide a Tb- or Mn-containing oxide phosphorescent glass whereby the above described problems of the prior art can be solved.

It is another object of the present invention to provide an oxide glass capable of exhibiting a long lasting afterglow and photostimulated luminescence of green or red emitted light readily observable, which can be melted without using any reducing agent or reducing atmosphere by utilizing Tb or Mn as a phosphorescent or luminescent agent.

These objects can be attained by an oxide glass capable of exhibiting a long lasting afterglow and photostimulated luminescence by excitation with radiations such as γ-rays, X-rays or UV-rays, having a constitutional composition comprising, at least, 21 to 80 mol % of germanium oxide ($GeO_2$) and the balance of zinc oxide (ZnO) or gallium oxide ($Ga_2O_3$), alkali metal oxide or alkaline earth metal oxide and terbium oxide ($Tb_2O_3$) or manganese oxide (MnO).

BRIEF DESCRIPTION OF THE DRAWINGS

The accompanying drawings illustrate the principle and merits of the present invention.

DETAILED DESCRIPTION OF THE INVENTION

Figure 1:
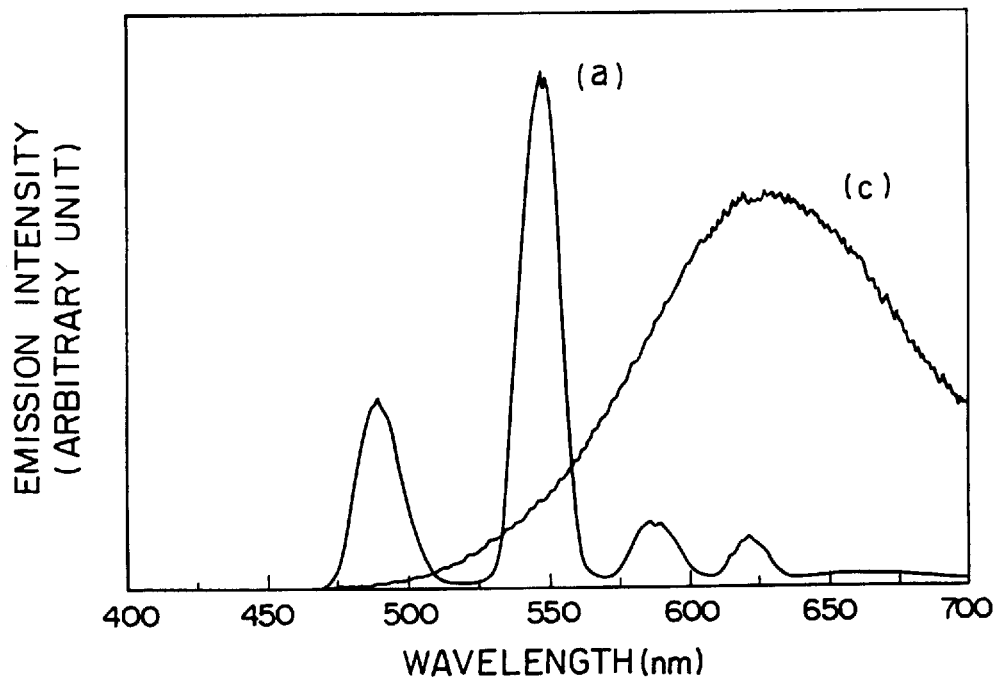
FIG. 1 is a graph, Curves (a) and (c) showing phosphorescent spectra of the glasses prepared respectively in Example 1 and Example 17, excited by an UV-ray of 330 nm.

Generally, rare earth ions under excited state tend to emit light in about one second to lose its energy. Thus, it is considered in the oxide glass containing a large amount of zinc, for example, glass of $SiO_2$—$B_2O_3$—$ZnO$—$Tb_2O_3$ type as formerly proposed in Japanese Patent Application No. 346362/1997 that energy is accumulated on the trapping level of zinc ion by a high energy of a radiation such as γ-rays, X-rays or UV-rays and the inventors have reached the present invention based on the knowledge that the energy on the trapping level is released by stimulus such as by heat, visible rays or infrared rays and removed to terbium ion to exhibit a long lasting afterglow and photostimulated luminescence Furthermore, a similar phenomenon appears also in the system of $SiO_2$—$Ga_2O_3$—$Na_2O$—$Tb_2O_3$ of Japanese Patent Application No. 88674/1998.

In the glass system of the present invention, on the other hand, $GeO_2$ is used as an essential component of the glass to obtain a longer lasting afterglow and photostimulated luminescence than the systems of $SiO_2$—$B_2O_3$—$ZnO$—$Tb_2O_3$ and $SiO_2$—$Ga_2O_3$—$Na_2O$—$Tb_2O_3$. Furthermore, a long lasting afterglow can be obtained by an ordinary fluorescent lamp or sunlight without using any special excitation light source, because accumulation of light can be made by a low energy light of longer wavelength.

That is, according to the present invention, there is provided (1) an oxide glass capable of exhibiting a long lasting afterglow and photostimulated luminescence by excitation with radiations such as γ-rays, X-rays or UV-rays, having a constitutional composition comprising, at least, 21 to 80 mol % of germanium oxide ($GeO_2$) and the balance of zinc oxide (ZnO) or gallium oxide ($Ga_2O_3$), alkali metal oxide or alkaline earth metal oxide and terbium oxide ($Tb_2O_3$) or manganese oxide (MnO).

Specifically, the present invention relates to (2) an oxide fluorescent or phosphorescent glass capable of exhibiting a long lasting afterglow and photostimulated luminescence, as described in the above (1), which is represented, in term of atoms for making up the glass, by the following chemical composition (mol %):

| | | |
|---|---|---|
| $GeO_2$ | 21 to 80% | |
| ZnO | 0 to 50% | |
| $Ga_2O_3$ | 0 to 55% | ($ZnO + Ga_2O_3$ = 3 to 55%) |
| $Tb_2O_3$ | 0 to 10% | |
| MnO | 0 to 2% | ($Tb_2O_3$ + MnO = 0.01 to 10%) |
| $R_2O$ | 0 to 45% | (R: at least one atom selected from Li, Na, K and Cs) |
| R'O | 0 to 40% | (R': at least one atom selected from Mg, Ca, Sr and Ba) |
| $R_2O$ + R'O | 0.5 to 45% | |
| $SiO_2$ | 0 to 50% | |
| $B_2O_3$ | 0 to 20% | |
| $Al_2O_3$ | 0 to 20% | |
| $Yb_2O_3$ | 0 to 7% | and |
| $Ln_2O_3$ | 0 to 5% | (Ln: at least one atom selected from Sm, Dy, Tm, Pr, Y, La, Gd, Lu and Nd). |

In the present invention, as a radiation, there can be used charged particle rays in addition to γ-rays, X-rays or UV-rays, described above.

PREFERRED EMBODIMENTS OF THE INVENTION

The reasons for limiting the composition range of each component of this oxide phosphorescent glass to described above are as follows:

$GeO_2$ is a component for serving to glass formation, which is present in a proportion of 21 to 80%, since if less than 21% or if more than 80%, the melting temperature is so high that preparation of the glass is difficult. The preferred range is 21 to 75%.

ZnO is a component for accumulating energy, improving the melting property of the glass and rendering glass formation easy, which is present in a proportion of 0 to 50%, since if more than 50%, glass formation is difficult. The preferred range is 0 to 45%.

$Ga_2O_3$ is a component for improving the lasting afterglow effect of the glass, which is present in a proportion of 0 to 55%, since if more than 55%, the glass is unstable and tends to be crystallized. The preferred range is 0 to 50%.

The sum of $ZnO+Ga_2O_3$ should be 3 to 55%, since if less than 3%, the emission intensity is lower, while if more than 55%, the melting temperature is so high that preparation of the glass is difficult. The preferred range of the sum is 5 to 50%.

$Tb_2O_3$ is a component for presenting green phosphorescence, which is present in a proportion of 0 to 10%, since if more than 10%, it is difficult to obtain the glass. The preferred range is 0 to 8%.

MnO is a component capable of presenting red phosphorescence, which is present in a proportion of 0 to 2%, since if more than 2%, it is difficult to obtain the glass. The preferred range is 0 to 1%.

The sum of $Tb_2O_3$ and MnO should be 0.01 to 10%, since if less than 0.01%, the emission intensity is lower, while if more than 10%, it is difficult to obtain the glass. The preferred range is 0.05 to 8%.

$R_2O$ (R: at least one atom selected from Li, Na, K and Cs) acts to lower the melting temperature of the glass melt, which is present in a proportion of 0 to 45%, since if exceeding 45%, the water resisting property is lowered and the devitrification tendency is increased, thus rendering the glass unstable. The preferred range is 0 to 40%.

R'O (R': at least one atom selected from Mg, Ca, Sr and Ba) are components for improving the melting property of the glass, which are present in a proportion of 0 to 40%, since if more than 40%, the glass is unstable and tends to be crystallized. The preferred range of R'O is 0 to 35%.

The sum of $R_2O$+R'O should be 0.5 to 45%, since if less than 0.5%, the melting temperature is so high that preparation of the glass is difficult and if more than 45%, the glass is unstable and tends to be crystallized. The preferred range of the sum is 1 to 40%.

$SiO_2$ is a glass-forming component, which is present in a proportion of 0 to 50%, since if more than 50%, the glass melting temperature is too increased to prepare the glass. The preferred range is 0 to 45%.

$B_2O_3$ is a glass-forming component, which is present in a proportion of 0 to 20%, since if more than 20%, the emission intensity is lowered. The preferred range is 0 to 15%.

$Al_2O_3$ is a component for improving the durability of the glass, which should be present in a proportion of 0 to 20%, since if more than 20%, the melting temperature of the glass is too increased to prepare the glass. The preferred range is 0 to 15%.

$Yb_2O_3$ acts as a sensitizer to further increase the lasting afterglow effect of the glass, which is present in a proportion of 0 to 7%, since if more than 7%, the effect thereof is lowered. The preferred range is 0 to 5%.

$Ln_2O_3$ (Ln: at least one atom selected from Sm, Dy, Tm, Pr, Y, La, Gd, Lu and Nd) is a component for increasing the viscosity of the glass and suppressing crystallization. This component should be present in a proportion of 0 to 5%, since if more than 5%, the above described effect is deteriorated. The preferred range is 0 to 3%.

Cleaning agents such as $Sb_2O_3$ or $As_2O_3$ and the commonly used auxiliary components, for example, $P_2O_5$, $WO_3$, $TeO_2$, $Bi_2O_3$, $Nb_2O_5$, $Ta_2O_5$, $TiO_2$, CdO, SnO, PbO, $Tl_2O$, CoO, F, Cl and Br can optionally be added, in such an amount that the effects of the present invention are not deteriorated, to the glass composition.

Production of an oxide phosphorescent glass capable of visually exhibiting a long lasting afterglow and photostimulated luminescence is carried out by mixing the corresponding raw material compounds to a proportion of the object composition, for example, germanium oxide, zinc oxide, gallium oxide, terbium oxide, manganese oxide, etc., melting the resulting mixture in the air at a temperature of 1100 to 1500° C. for 1 to 3 hours and allowing the mixture to flow out in a metallic mold, followed by shaping.

In the oxide phosphorescent glass of the present invention, the afterglow time is generally in a range of about at least one second, preferably about one second to two hours.

Preferred embodiments of the present invention are summarized below:

(I) Oxide glasses each capable of exhibiting a long lasting afterglow and photostimulated luminescence, as described in the foregoing (1), which is represented, in term of atoms for making up the glass, by chemical compositions (mol %) shown in Table 1:

TABLE 1

| | |
|---|---|
| $GeO_2$ | 21 to 75% |
| ZnO | 0 to 45% |
| $Ga_2O_3$ | 0 to 50% |

TABLE 1-continued

| | |
|---|---|
| ZnO + Ga₂O₃ | 5 to 50% |
| Tb₂O₃ | 0 to 8% |
| MnO | 0 to 1% |
| Tb₂O₃ + MnO | 0.05 to 8% |
| R₂O ① | 0 to 40% |
| R'O ② | 0 to 35% |
| R₂O + R'O | 1 to 40% |
| SiO₂ | 0 to 45% |
| B₂O₃ | 0 to 15% |
| Al₂O₃ | 0 to 15% |
| Yb₂O₃ | 0 to 5% |
| Ln₂O₃ ③ | 0 to 3% |

(Note)
① R: at least one atom selected from Li, Na, K and Cs
② R': at least one atom selected from Mg, Ca, Sr and Ba
③ Ln: at least one atom selected from Sm, Dy, Tm, Pr, Y, La, Gd, Lu and Nd The present invention will now be illustrated in detail without limiting the same:

EXAMPLE 1

Raw materials were mixed according to weight ratios of Example No. 1 shown in Table 2 to give a composition of Example No. 1 shown in Table 3. The thus prepared raw materials were melted at a temperature of 1100 to 1500° C. for 1 to 3 hours, allowed to flow in a metallic mold and shaped to obtain a glass in stable manner.

When the resulting glass was excited by an ultraviolet ray of 330 nm, green afterglow phosphorescence was exhibited to give a phosphorescent spectrum shown in FIG. 1(a). A change of emission intensity with time as to the glass excited by the UV ray of 330 nm is shown in FIG. 2(a). When this glass was irradiated by X-rays and then by a semiconductor laser of 800 nm or 980 nm, a green photo-stimulated luminescence was visually observed.

EXAMPLES 2 TO 16

Raw materials were mixed according to weight ratios of Example Nos. 2 to 16 shown in Table 2 and melted in the similar manner to Example 1 to obtain various glass compositions (Example Nos. 2 to 16) shown in Table 3 in stable manner.

When the resulting glasses in Examples 2 to 16 were excited by an ultra-violet ray of 330 nm, there were obtained similar spectra to FIG. 1(a) exhibiting green photostimulated luminescence similar to Example 1 and change of emission intensity of thereof with time, similar to FIG. 2(a). The change in the case of Example 3 is shown in FIG. 2(b). When these glasses were irradiated by X-rays in the similar manner to Example 1 and then by a semiconductor laser of 800 nm, a green photostimulated luminescence was visually observed.

EXAMPLE 17

Raw materials were mixed according to weight ratios of Example No. 17 shown in Table 2 to give a composition of Example No. 17 shown in Table 3. The thus prepared raw materials were melted at a temperature of 1100 to 1500° C. for 1 to 3 hours, allowed to flow in a metallic mold and shaped to obtain a glass in stable manner.

When the resulting glass was excited by an ultraviolet ray of 330 nm, red afterglow phosphorescence was exhibited to give a phosphorescent spectrum shown in FIG. 1(c). A change of emission intensity with time as to the glass excited by the UV ray of 330 nm is shown in FIG. 2(c). When this glass was irradiated by X-rays and then by a semiconductor laser of 800 nm or 980 nm, a red photostimulated luminescence was visually observed.

EXAMPLES 18 TO 21

Raw materials were mixed according to weight ratios of Example Nos. 18 to 21 shown in Table 2 and melted in the similar manner to Example 17 to obtain various glass compositions (Example Nos. 18 to 21) shown in Table 3 in stable manner.

Figure 2:
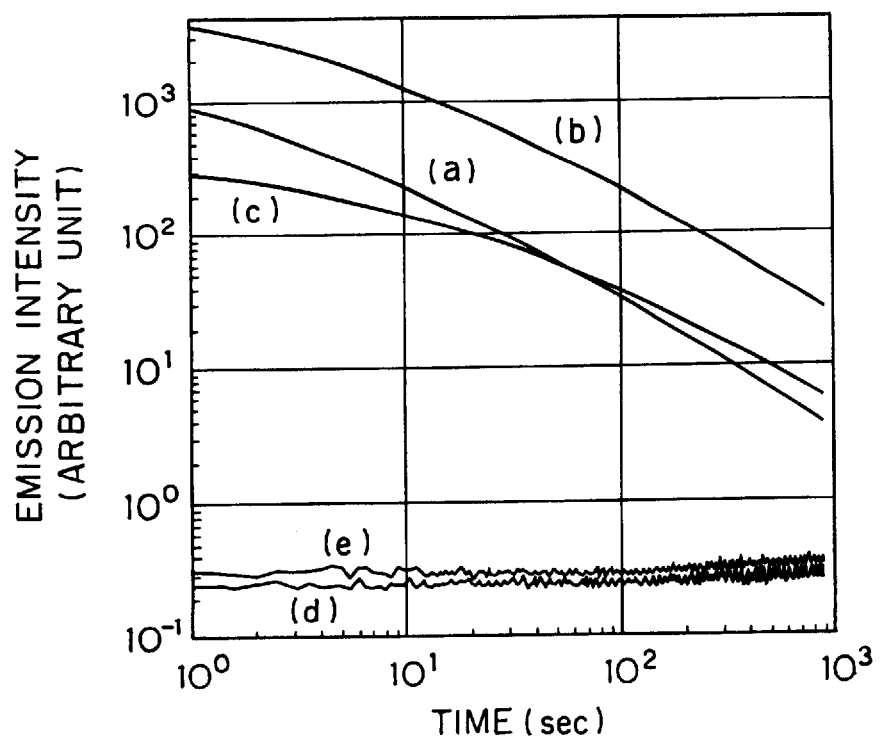
FIG. 2 is a graph, Curves (a), (b), (c), (d) and (e) showing a change of emission intensity with time as to the glasses prepared, respectively in Examples 1, 3 and 17 and Comparative Examples 1 and 2, excited by an UV-ray of 330 nm.

When the resulting glasses in Examples 18 to 21 were excited by an ultra-violet ray of 330 nm, there were obtained similar spectra to FIG. 1 exhibiting red photostimulated luminescence similar to Example 17 and change of emission intensity of thereof with time, similar to FIG. 2. When these glasses were irradiated by X-rays in the similar manner to Example 17 and then by a semiconductor laser of 800 nm or 980 nm, a red photo-stimulated luminescence was visually observed.

COMPARATIVE EXAMPLES 1 AND 2

Glasses having compositions shown in Comparative Examples 1 and 2 of Table 2, as a comparative example, were prepared in the similar manner to Example 1. When the resulting glasses were excited by an ultraviolet ray of 330 nm under the similar condition to Example 1, any afterglow phosphorescence was not observed and the change of the emission intensity with time was shown in FIG. 2(d) and (e).

TABLE 2

(g)

| | Example No. | | | | | | | |
|---|---|---|---|---|---|---|---|---|
| | 1 | 2 | 3 | 4 | 5 | 6 | 7 | 8 |
| GeO₂ | 66.82 | 54.98 | 21.85 | 39.14 | 24.96 | 77.89 | 50.29 | 42.36 |
| ZnO | 21.66 | | | 34.81 | | 17.31 | 19.56 | 24.72 |
| Ga₂O₃ | | 32.84 | 64.06 | 10.02 | 59.65 | | | 18.98 |
| Tb₂O₃ | 0.78 | 0.64 | 0.56 | 1.56 | 0.58 | 0.78 | 1.76 | 1.48 |
| MnO | | | | | | | | |
| Na₂O | 9.90 | 10.86 | 12.94 | 2.65 | 14.79 | | | 5.02 |
| Yb₂O₃ | 0.84 | 0.69 | 0.60 | 0.84 | | 0.84 | 0.95 | |
| SiO₂ | | | | 3.21 | | | 7.22 | 6.08 |
| B₂O₃ | | | | 7.44 | | | | |
| Al₂O₃ | | | | | | | | |
| Li₂O | | | | 0.32 | | 3.18 | | 0.61 |
| CaO | | | | | | | 20.22 | |
| Dy₂O₃ | | | | | | | | 0.76 |
| Sm₂O₃ | | | | | | | | |

(g)

| | Example No. | | | | | | | |
|---|---|---|---|---|---|---|---|---|
| | 9 | 10 | 11 | 12 | 13 | 14 | 15 | 16 |
| GeO₂ | 52.07 | 33.11 | 51.13 | 62.70 | 23.28 | 53.66 | 57.91 | 62.36 |
| ZnO | 27.01 | 25.76 | 22.10 | 20.32 | | 17.39 | 18.77 | |
| Ga₂O₃ | | | | 9.36 | 50.06 | 8.01 | 8.65 | 18.62 |
| Tb₂O₃ | 1.62 | 1.85 | 1.59 | 0.73 | 1.30 | 15.64 | 1.69 | 0.73 |
| MnO | | | | | | | | |
| Na₂O | 5.48 | 7.85 | 6.73 | 6.19 | 19.31 | 5.30 | 5.72 | 12.32 |
| Yb₂O₃ | 0.87 | 1.0 | 0.86 | | | 0.70 | 7.27 | |
| SiO₂ | 6.65 | 30.43 | 6.53 | | 5.35 | | | 5.97 |
| B₂O₃ | | | | | | | | |
| Al₂O₃ | 5.64 | | 11.07 | | | | | |
| Li₂O | 0.66 | | | | | | | |
| CaO | | | | | | | | |

TABLE 2-continued

| | | | | | | (g) |
|---|---|---|---|---|---|---|
| | | Example No. | | | Comparison | |
| | 17 | 18 | 19 | 20 | 21 | 1 | 2 |
| GeO$_2$ | 43.01 | 62.63 | 63.14 | 63.56 | 22.09 | 14.85 | |
| ZnO | 25.10 | 20.30 | 20.47 | 20.60 | | 5.78 | 64.27 |
| Ga$_2$O$_3$ | 19.27 | 9.35 | 9.43 | 9.49 | 64.77 | | |
| Tb$_2$O$_3$ | | 1.46 | | | | 1.03 | 0.96 |
| MnO | 0.073 | 0.071 | 0.71 | 0.072 | 0.054 | | |
| Na$_2$O | 6.37 | 6.18 | 6.24 | 6.28 | 13.09 | 13.20 | |
| Yb$_2$O$_3$ | | | | | | | |
| SiO$_2$ | 6.18 | | | | | 25.59 | 11.86 |
| B$_2$O$_3$ | | | | | | 39.54 | 22.91 |
| Al$_2$O$_3$ | | | | | | | |
| Li$_2$O | | | | | | | |
| CaO | | | | | | | |
| Dy$_2$O$_3$ | | | | | | | |
| Sm$_2$O$_3$ | | | | | | | |

TABLE 3

| | | | | | | | (mol %) |
|---|---|---|---|---|---|---|---|
| | | | Example No. | | | | |
| | 1 | 2 | 3 | 4 | 5 | 6 | 7 | 8 |
| GeO$_2$ | 59.76 | 59.76 | 27.39 | 34.79 | 29.94 | 69.72 | 39.76 | 39.76 |
| ZnO | 24.90 | | | 39.76 | | 19.92 | 19.88 | 29.82 |
| Ga$_2$O$_3$ | | 19.92 | 44.82 | 4.97 | 39.92 | | | 9.94 |
| Tb$_2$O$_3$ | 0.20 | 0.20 | 0.20 | 0.40 | 0.20 | 0.20 | 0.40 | 0.40 |
| MnO | | | | | | | | |
| Na$_2$O | 14.94 | 19.92 | 27.39 | 3.98 | 29.94 | | | 7.95 |
| Yb$_2$O$_3$ | 0.20 | 0.20 | 0.20 | | | 0.20 | 0.20 | |
| SiO$_2$ | | | | 4.97 | | | 9.94 | 9.94 |
| B$_2$O$_3$ | | | | 9.94 | | | | |
| Al$_2$O$_3$ | | | | | | | | |
| Li$_2$O | | | | 0.99 | | 9.96 | | 1.99 |
| CaO | | | | | | | 29.82 | |
| Dy$_2$O$_3$ | | | | | | | | 0.20 |
| Sm$_2$O$_3$ | | | | | | | | |

| | | | | | | | (mol %) |
|---|---|---|---|---|---|---|---|
| | | | Example No. | | | | |
| | 9 | 10 | 11 | 12 | 13 | 14 | 15 | 16 |
| GeO$_2$ | 44.73 | 24.85 | 44.73 | 59.76 | 24.85 | 57.14 | 58.54 | 59.88 |
| ZnO | 29.82 | 24.85 | 24.85 | 24.90 | | | 23.81 | 24.39 |
| Ga$_2$O$_3$ | | | | 4.98 | 29.82 | 4.76 | 4.88 | 9.98 |
| Tb$_2$O$_3$ | 0.40 | 0.40 | 0.40 | 0.20 | 0.40 | 4.76 | 0.49 | 0.20 |
| MnO | | | | | | | | |
| Na$_2$O | 7.95 | 9.94 | 9.94 | 9.96 | 34.79 | 9.52 | 9.76 | 19.96 |
| Yb$_2$O$_3$ | 0.20 | 0.20 | 0.20 | | 0.20 | | 1.95 | |
| SiO$_2$ | 9.94 | 39.76 | 9.94 | | 9.94 | | | 9.98 |
| B$_2$O$_3$ | | | | | | | | |
| Al$_2$O$_3$ | 4.97 | | 9.94 | | | | | |
| Li$_2$O | 1.99 | | | | | | | |
| CaO | | | | | | | | |
| Dy$_2$O$_3$ | | | | | | | | |
| Sm$_2$O$_3$ | | | | | 0.20 | | | |

| | | | | | | (mol %) | |
|---|---|---|---|---|---|---|---|
| | | | Example No. | | | Comparison | |
| | 17 | 18 | 19 | 20 | 21 | 1 | 2 |
| GeO$_2$ | 39.96 | 59.70 | 59.41 | 59.94 | 27.47 | 9.98 | |
| ZnO | 29.97 | 24.88 | 24.75 | 24.98 | | 4.99 | 59.88 |
| Ga$_2$O$_3$ | 9.99 | 4.98 | 4.95 | 5.0 | 44.96 | | |
| Tb$_2$O$_3$ | | 0.40 | | | | 0.20 | 0.20 |
| MnO | 0.10 | 0.10 | 0.99 | 0.10 | 0.10 | | |
| Na$_2$O | 9.99 | 9.95 | 9.90 | 9.99 | 27.47 | 14.97 | |
| Yb$_2$O$_3$ | | | | | | | |
| SiO$_2$ | 9.99 | | | | | 29.94 | 14.97 |
| B$_2$O$_3$ | | | | | | 39.92 | 24.95 |
| Al$_2$O$_3$ | | | | | | | |
| Li$_2$O | | | | | | | |
| CaO | | | | | | | |
| Dy$_2$O$_3$ | | | | | | | |
| Sm$_2$O$_3$ | | | | | | | |

ADVANTAGES OF THE INVENTION

According to the present invention, there can be provided an oxide glass capable of exhibiting a long lasting afterglow and photostimulated luminescence, whereby energy can be accumulated by radiation excitation, for example, by γ-rays, X-rays, UV-rays, etc., light emission can be continued for a long time even after stopping the excitation and photostimulated luminescence can be exhibited by irradiation of visible rays or infrared rays. That is, the long lasting afterglow and photostimulated luminescence oxide glass of the present invention can be used not only as a phosphorescent material for night illumination or night signal, but also as a material for confirming an infrared laser or controlling an optical axis because of exhibiting photostimulated luminescence by irradiation of infrared rays. When this glass is converted into fibers, an emitted light in the fiber can efficiently be guided to the end surface of the fiber. In addition, this glass is useful for recording or reproducing of γ-rays, X-rays, UV-rays images without coating the photostimulated luminescent material and can be applied to an optical recording material of such a type that can be read.

What is claimed is:

1. An oxide fluorescent or phosphorescent glass capable of exhibiting a long lasting afterglow and photostimulated luminescence having a constitutional composition comprising, in terms of atoms for making up the glass, the following chemical composition (mol %):

GeO$_2$ at 21 to 80%;
ZnO at 0 to 50%;
Ga$_2$O$_3$ at 0 to 55%;
ZnO+Ga$_2$O$_3$ at 3 to 55%;
Tb$_2$O$_3$ at 0 to 8%;
MnO at 0 to 2%;
Tb$_2$O$_3$+MnO at 0.01 to 8%;
R$_2$O at 0 to 45%, wherein R includes at least one atom selected from Li, Na, K and Cs;
R'O at 0 to 40%, wherein R' includes at least one atom selected from Mg, Ca, Sr and Ba;
R$_2$O+R'O at 0.5 to 45%;
SiO$_2$ at 0 to 50%;
B$_2$O$_3$ at 0 to 20%;
Al$_2$O$_3$ at 0 to 20%;
Yb$_2$O$_3$ at 0 to 7%; and
Ln$_2$O$_3$ at 0 to 3%, wherein Ln includes at least one atom selected from Sm, Dy, Tm, Pr, Y, La, Gd, Lu and Nd.

2. The glass of claim 1, wherein said chemical composition comprises about 0–5 mol % of Tb$_2$O$_3$.

3. The glass of claim 1, wherein said chemical composition comprises 0–4.76 mol % of Tb$_2$O$_3$.

* * * * *